United States Patent
Harada et al.

(10) Patent No.: US 10,455,806 B1
(45) Date of Patent: Oct. 29, 2019

(54) DEVICE AND METHOD OF RESTRICTING ANIMAL LITTER MOVEMENT

(71) Applicant: Vium, Inc., San Mateo, CA (US)

(72) Inventors: Kevin Harada, San Mateo, CA (US); Joe Betts-Lacroix, Belmont, CA (US); Gordon Bryce Jensen, Santa Clara, CA (US)

(73) Assignee: Vium Inc., San Mateo, CA (US)

( * ) Notice: Subject to any disclaimer, the term of this patent is extended or adjusted under 35 U.S.C. 154(b) by 152 days.

(21) Appl. No.: 15/444,637

(22) Filed: Feb. 28, 2017

(51) Int. Cl.
| A01K 1/035 | (2006.01) |
| A01K 1/03 | (2006.01) |
| A01K 11/00 | (2006.01) |
| A01K 29/00 | (2006.01) |
| A01K 1/015 | (2006.01) |

(52) U.S. Cl.
CPC .............. *A01K 1/035* (2013.01); *A01K 1/031* (2013.01); *A01K 11/006* (2013.01); *A01K 29/005* (2013.01); *A01K 1/0152* (2013.01)

(58) Field of Classification Search
CPC .......... A10K 1/035; A10K 1/031; A10K 1/03; A10K 1/015; A10K 1/0151; A10K 1/0011
See application file for complete search history.

(56) References Cited

U.S. PATENT DOCUMENTS

| 3,260,236 A * | 7/1966 | Jones ...................... A01K 1/031 |
| | | 119/417 |
| 3,516,389 A * | 6/1970 | Meyer ..................... A01K 1/031 |
| | | 119/417 |
| 3,857,364 A * | 12/1974 | Miller, Jr. .............. A01K 1/031 |
| | | 119/417 |
| 4,542,713 A * | 9/1985 | Hansen ................... A01K 1/031 |
| | | 119/417 |
| 4,935,502 A | 9/1990 | Hoover |
| 5,054,427 A * | 10/1991 | Hoover ................... A01K 1/031 |
| | | 119/416 |
| 5,095,852 A | 3/1992 | Hoover |
| 5,320,064 A | 6/1994 | Selstad |
| 5,975,017 A | 11/1999 | Cameron |
| 6,698,384 B2 * | 3/2004 | Markowitz ........... A01K 1/0107 |
| | | 119/165 |
| 7,185,609 B2 | 3/2007 | Bryant |
| 8,132,537 B2 | 3/2012 | Trunnell |
| 8,534,225 B2 * | 9/2013 | Vermeegen .......... A01K 5/0114 |
| | | 119/421 |

(Continued)

FOREIGN PATENT DOCUMENTS

DE    20 2012 005 527 U1    9/2012

*Primary Examiner* — Kristen C Hayes
(74) *Attorney, Agent, or Firm* — Kim Rubin, Patent Agent

(57) ABSTRACT

A device and method of keeping litter in an animal cage away from equipment in an animal cage. Embodiments comprise two or more walls to define three zones in an animal cage: an equipment zone, a channel zone, and an outsize zone. The channel zone connects the outside zone with the equipment zone. Baffles in the channel zone permit access by animals but block some fraction of litter from passing from the outsize zone into the equipment zone. Embodiments include a weighing scale in the equipment zone. Embodiments include shapes that constrain devices or equipment to predetermined locations within a cage. Embodiments include methods of use and use in a vivarium.

19 Claims, 7 Drawing Sheets

(56) References Cited

U.S. PATENT DOCUMENTS

| | | | | |
|---|---|---|---|---|
| 8,899,180 | B2 * | 12/2014 | Lindskov | A01K 5/0114 |
| | | | | 119/61.1 |
| 9,163,393 | B2 * | 10/2015 | Carroll | E04H 1/00 |
| 2001/0047768 | A1 * | 12/2001 | Markowitz | A01K 1/0107 |
| | | | | 119/165 |
| 2010/0077961 | A1 | 4/2010 | Lipscomb | |
| 2011/0308470 | A1 * | 12/2011 | Vermeegen | A01K 5/0114 |
| | | | | 119/51.5 |
| 2013/0305996 | A1 * | 11/2013 | Lindskov | A01K 5/0114 |
| | | | | 119/61.1 |
| 2014/0196671 | A1 * | 7/2014 | Taylor | A01K 15/025 |
| | | | | 119/707 |

\* cited by examiner

DEVICE AND METHOD OF RESTRICTING ANIMAL LITTER MOVEMENT

This invention relates to a device and a method of using the device, in an animal cage, to restrict motion of animal litter from one cage location to another.

BACKGROUND OF THE INVENTION

Prior art includes: D1 Hoover U.S. Pat. No. 4,953,502; D2 Trunneil U.S. Pat. No. 8,132,537; D3 Selstad U.S. Pat. No. 5,320,064; D4 Hediermann DE202012005527U1; D5 Hoover U.S. Pat. No. 5,095,852; D6 Cameron U.S. Pat. No. 5,975,017; D7 Bryant U.S. Pat. No. 7,185,609; and D8 Lipscomb US20100077961A1. Prior art devices are variously for housing, husbandry, or play of rodents, pets, and pigs. A common issue is creating a first animal area primarily for litter or bedding and a second animal area free of litter or bedding.

Vivariums house a number of animals, typically test animals, such as mice, in a number of cages, often a large number. The test animals are frequently used test drugs, genetics, animal strains, husbandry practices, methods of treatment, procedures, diagnostics, and the like. We refer to all such uses of a vivarium as a study.

Animal cages house a range of equipment, such as a water dispenser, a food bowl, exercise equipment, other husbandry elements, a scale, cameras, sensors, and animal identification devices.

Animal cages also contain litter on the floor of the cage to absorb urine and feces. Often, the litter is also used by the animal for nesting. Animals typically move the litter all over the cage, both intentionally and non-intentionally as a result of animal activity. Animal litter is sometimes called animal bedding, or animal bedding litter.

This animal litter often interferes with the proper operation of the equipment in the cage. In particular, litter can interfere with operation of a scale. Thus, it is often desirable to keep litter away from some equipment by restricting the movement of litter in the cage.

Prior art D2, D3, D6, D7 and D8 describe a closed device that is an animal cage, rather than a open device for use in an animal cage. Prior art D2 describes a two-compartment cage suitable for an animal that will train to use a specific area for urination and defecation, such as cats and dogs, but not rodents. D1, D4, D5, and D8 describe animal climbing structures, lacking litter containment baffles. Prior art devices do not isolate a cage into three distinct regions with respect to litter confinement. Prior art devices do not provide a structure designed for easy animal passage that also restricts movement of litter, comprising more than one baffle. Prior art devices do not define fixed regions in a cage with respect to holding equipment in a fixed location substantially free of litter. Prior art devices are not monolithic or sterilizable.

The problem to solve addressed by this invention is keeping litter in an animal cage away from equipment in the cage, with consideration and a solution for cage animal moving litter within a cage, and with constraints of operating effectively in a vivarium.

SUMMARY OF THE INVENTION

In one embodiment a monolithic device sits on an animal cage floor, using low walls to effectively create three open-at-top zones in the cage: a scale zone, a zone outside the device, and a channel zone connecting the scale and outside zone. The scale zone comprises an open platform that uses a lip or ledges to support a scale in a fixed location. The channel may be thought of as a hallway or short, open-top maze through which an animal may readily move between the outside area and the scale area, without having to go over a wall. The outside area is within the cage, but separate from the scale area and the channel. Initially, when deployed in an animal cage, litter is placed in the outside area but not in the scale area or channel; the device sits directly on the cage floor. The device also has mechanical elements, such as projections, that locate the device in a fixed location within a cage. The device lifts in an out of cages and comprises alignment elements such that if fits in a single predetermined location in a cage. The device is open on top, permitting unobstructed human and automated vision of the animal throughout the device and cage.

The channel contains baffles in the form of multiple low hurdles over which an animal may easily move but which each block some fraction of litter.

The device, in use, sits on the floor of an animal cage. The walls and baffles of the device are in contact with the floor cage such that neither animals nor a significant amount of litter may pass under either the walls or baffles. Some litter will always make its way from the outside zone to the equipment zone. The purpose of the device is to prevent a quantity of litter from accumulating around, under, or over equipment in the equipment zone that might compromise the operation of the equipment. That is, the device limits the movement of litter from the outside zone to the equipment zone. Such limitation of litter movement is due to both the height of the walls—minimizing litter going over the walls, and a series of baffles in the channel zone—each baffle blocking a fraction of litter that is pushed or dragged into the channel zone.

Walls are high enough that animals cannot throw or push litter over the walls. The baffles are high enough to block a fraction of litter that would otherwise move from the outside zone side of the baffle to the equipment zone side of the baffle; while still allowing an animal, even a sick or infant animal, to walk or climb over the baffle. The fraction of litter blocked by a baffle may vary considerably. One such range might be 10% to 90%. A sequence of baffles in the channel has an accumulative effect: more litter is blocked that would be blocked by a single baffle. Even so, some litter will make its way through the channel, over the baffles, into the equipment zone. For example, some litter may cling to an animal, and then fall free in the equipment zone.

The three zones created by the walls—in conjunction with cage walls—are open at top to permit unobstructed observation of the animals in all zones. Animals are free to climb over walls, if they so choose. The height of the wall is selected to restrict litter from going over the wall, not to restrict animals from going over the wall. Thus, a device wall is unlike a cage wall. For the free movement of air and light, device walls should be as low as possible that still block thrown litter.

The function of the device is to limit travel of litter over an effective usage time period of the device. Such a time period may be between changes of the litter in the cage. Typically, when the litter is changed, equipment and the device are removed from the cage; used litter is removed; the device is returned to the cage (or first cleaned, or replaced); fresh litter is added to the cage in the outside zone but not to the equipment zone or the channel zone; equipment is returned (or first cleaned or replaced) to the cage, and animals are then returned to the cage if they have been removed for the litter change. When a study is over or the animals in the cage no longer need the cage, typically the cage and all equipment and devices within the cage are sterilized or discarded, such that new animals, or a new study, start with a pathogen-free environment.

DETAILED DESCRIPTION OF THE INVENTION

Figure 1:
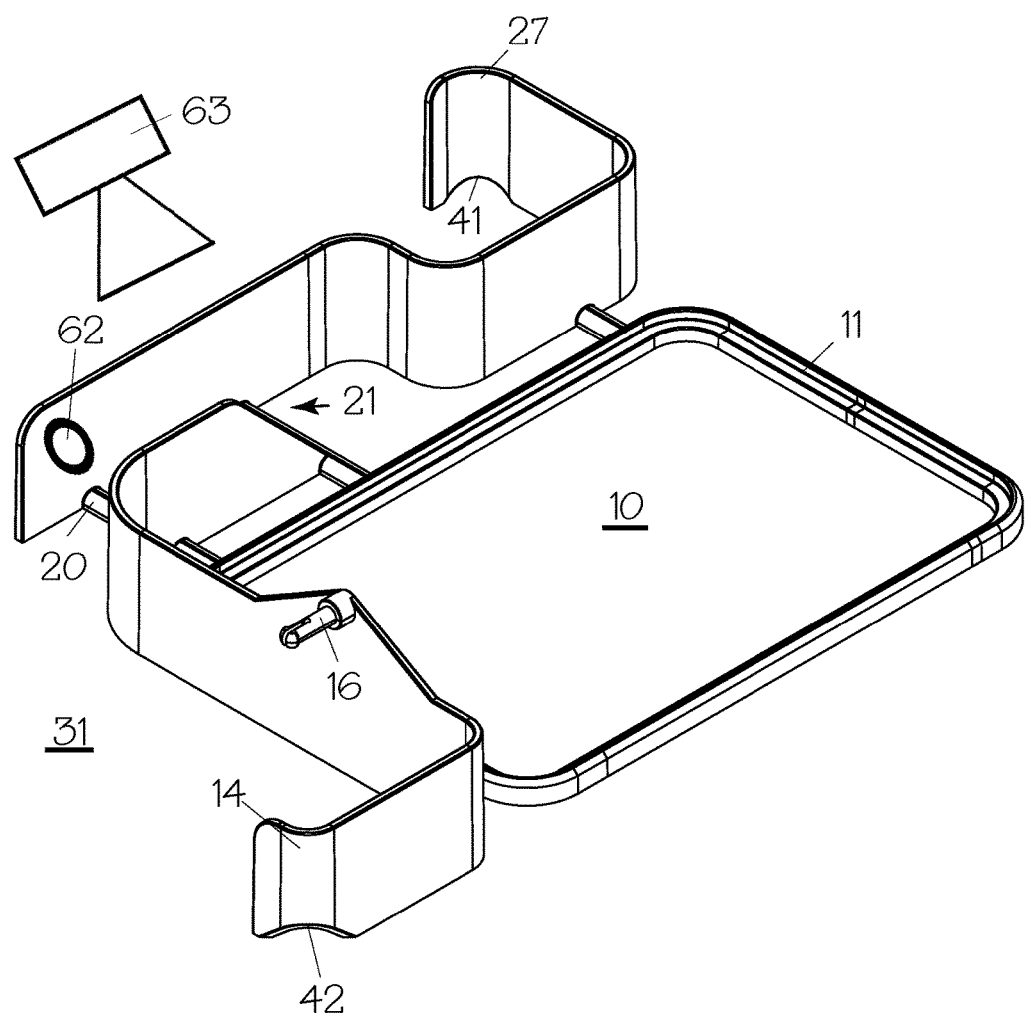
FIG. 1 shows a perspective view of the device.

Turning now to FIG. 1, we see a perspective view of one embodiment of the device. Two walls are visible 14 and 27. When used in a cage, these walls create three zones: an equipment zone 10, a channel zone 21, and an outside zone 31. A rectangular support for equipment is shown 11, with a lip and curved corners. Corner cuts 41 and 42 are visible in the bottom of both walls. These corner cuts fit into the curved inside corners of an animal cage, not shown. A pin 16 is visible to support and locate a piece of equipment in the outside zone 31. The outside zone 31 is a zone inside a cage with litter for animals. Typically, animals will nest in this zone. There may be other equipment such as an exercise wheel, not shown. There may be a food bowl, not shown, in this zone.

Element 62 schematically shows an RFID reader at the entrance to the channel zone 21. Such an RFID reader may identify an RFID equipped animal as it enters or leaves the channel zone. Elements 63 schematically shows a camera positions over the channel zone. Such a camera may record an animal in or passing through the channel zone.

Figure 2:
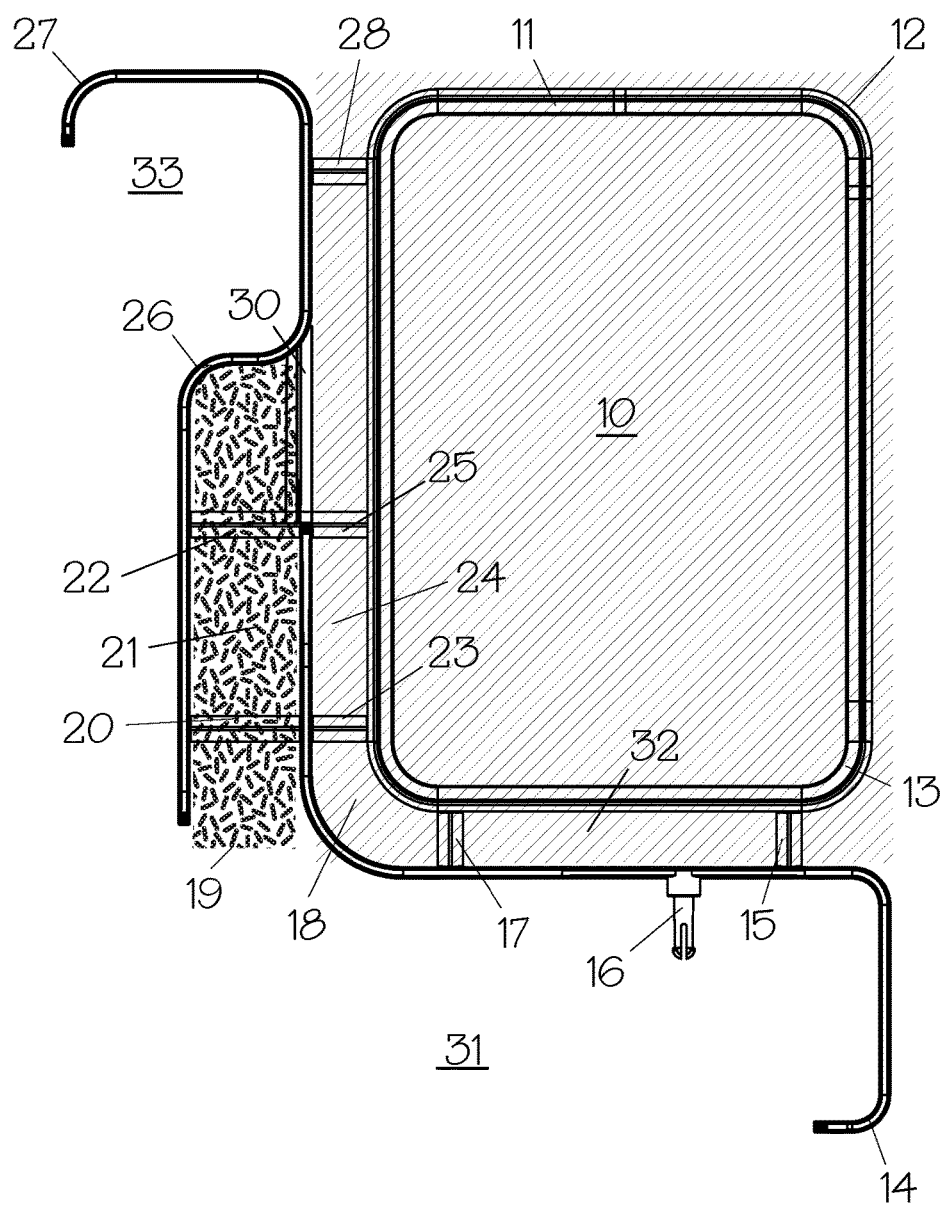
FIG. 2 shows a top view of the device.

Turning now to FIG. 2, we see a top view of an embodiment with detail identified. When used in a cage, this Figure may be considered a plan view. Two curved walls are visible, 14 and 27. These walls, in conjunction with cage walls, define three zones: an equipment zone 10 shown as with diagonal line pattern; a channel zone 21 shown with a pattern; and an outside zone identified in two places as 31 and 33. 19 shows the entry to the channel zone 21 from the outside zone 31.

Equipment may be supported in an optional equipment stand 11. Here a lip in the shape of a rectangle with curved corners supports equipment, such as a scale. Note that the base of the equipment is slightly elevated above the cage floor by this lip. Such a lip or support is optional. 12 shows a curved corner of the support, which when used in a cage, would be close to or touching a corner of the cage, using this particular shape and embodiment. 13 shows another curved corner of the equipment support. 14 shows both one of the walls and a curved corner of the wall that fits into a corner of a cage. Diagonally opposite this corner 14 is a corner of the other wall, 27. These two corners, 14 and 27, align the device in a cage, in a predetermined and fixed position in the cage. The device may be lifted out of the cage. It is held in place by gravity. A lower portion of these corners 14 and 27 is cut so as to fit the curved corners of a cage. Such cuts are not visible in this Figure but are clearly visible in FIG. 1.

The walls 14 and 27 are connected in this monolithic embodiment to the equipment stand 11 via five connection bars:15, 17, 23, 25 and 28. In this embodiment these bars serve as connections and to define the shape and size of the equipment area. Shapes other than bars may be used for such connection.

A pin 16 from the device projects into the outsize zone 31. This pin may be used to support, align, or both a piece of equipment in the outsize zone, such as an exercise wheel. Such a pin is optional. More than one pin may be used. Shapes other than pins may be used, including supports similar to 11.

18, 24 and 32 shows portions of the equipment zone 10. It is useful to have space around the equipment where litter that makes it through the channel can harmlessly accumulate, such as space shown in three places as 18, 24 and 32. This area around the equipment that sits on support 11 is defined by the wall 14 and the connection points 15, 17, 23, 25 and 28; and the distance from the corner of the equipment support 12 from the cage walls, as determined by the relative locations of corners 14 and 27.

19 shows the entry into the channel zone 21 from the outside zone 31. The width of the channel zone 21 should be narrow enough to restrict passage to one animal at a time. This narrowness minimizes the amount of litter than moves through the channel. It also prevents animals from nesting, grooming, or other activity in the channel zone that might move litter through the channel. It is also useful for identifying animals, such as with a camera or another sensor, such as an RFID sensor located in or close to the channel zone. A narrow channel enforces a maximum distance between the mouse and the walls 14 and 27 in the channel zone 21. The channel zone 21 should be wide enough to accommodate the maximum width of one animal in the cage. Note that in some studies an animal may be fat. The combination of a channel that singulates animals and a short-range RFID sensor in the channel zone assures that only one animal ID is read at a time and that the animal is uniquely and reliability identified. Such unique identification may be important and challenging to obtain, particularly with respect to observing animal activity or measuring animal weight on a scale. An RFID sensor or reader is shown as 62 in FIG. 1. A camera is shown as 63 in FIG. 1.

Three baffles are shown 20, 22 and 30. Such baffles, which may number one, two, three, more than one, or more than two, are a key part of embodiments, The height of each baffle blocks some fraction of litter from moving from the outsize zone 31 to the equipment zone 10. The effect of a series of baffles, such as 20, 22, and 30, is cumulative. A range of suitable baffle count is two to five. Baffles need to be high enough to block some litter. They need to be low enough so that an animal can climb over, even if the animal is sick or infant. Water may be located in or above the equipment zone 10. Those trained in the art know suitable heights for walls and baffles. For mice in a cage, a range of wall heights is 2 cm to the height of the cage, or 3 to 8 cm. For mice in a cage, a range of baffle heights is 3 to 20 mm. Another range is 8 to 15 mm. For mice in a cage, a range of channel width is 25 to 55 mm., or 30 to 40 mm. Baffles do not need to be rectangular. Baffles do not need to be parallel to each other. A suitable shape for a baffle is a rectangular bar. The bar may be hollow or an inverted U. Other baffle shapes may be used, including a low wall, hump or hill. Baffles may be textured on top for an animal to grasp easily. Baffles may have a minimum width (along the channel axis) to enable an animal to easily step on top of the baffle. Baffles may specifically be shaped to be free of an upper edge that would an animal to step over the baffle rather than on the baffle. Baffle width may be in the range of 1 to 20 mm or 2 to 10 mm, or the width of the length of an animal's foot, within a reasonable tolerance, such as plus or minus 50%, or plus 100% minus 0%.

Specifically claimed are embodiments with exactly one baffle, with exactly two baffles, with exactly three baffles, and with two or more baffles. The number of baffles varies with the type of litter, the maximum amount of litter permitted around equipment, the activity of the animal(s) in the cage; time between cleanings, and other factors. Baffles may vary in height and shape, including angled baffles and baffles with recesses or holes to collect litter. Those in the art could easily adjust baffle count and configuration based on observations of proposed designs in cages.

26 identifies a curve in wall 27. This curve identifies the end of the channel zone 21.

Channel zones may be straight, as shown in the Figures. Channel zones may have a single angle, multiple angles, or may be a maze.

A suitable but non-limiting range for the ratio of channel length to channel width is 2:1 to 20:1.

An embodiment may be open on the bottom, closed on the bottom, or any portion open or closed. The bottom of embodiments does not have to be planer. There are no restrictions on how many points, elements of portions of an embodiment touch a cage bottom or cage walls in use.

In one embodiment one, two, or all walls may follow the topology of equipment in the equipment zone. That is, as shown in the Figures, the walls 14 and 27 and the channel zone 21 "wrap around" two sides of the equipment platform, 11.

Figure 3:
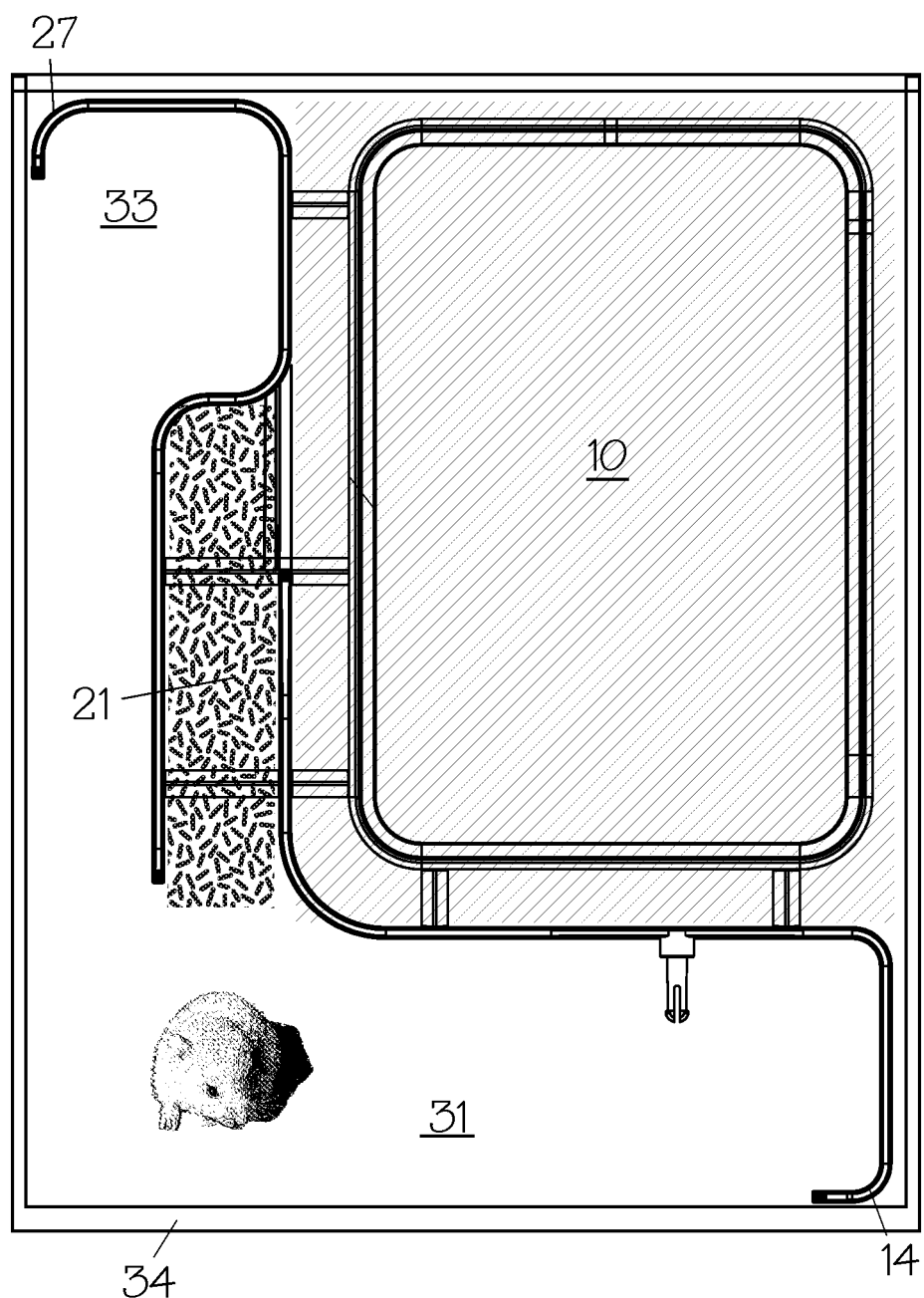
FIG. 3 shows a top view in a cage.

Turning now to FIG. 3, we see an embodiment in a cage 34. The equipment zone is 10. The channel zone is 21. The outside zone is 31. The walls 14 and 27, plus the cage walls 34, define the three zones.

Figure 4:
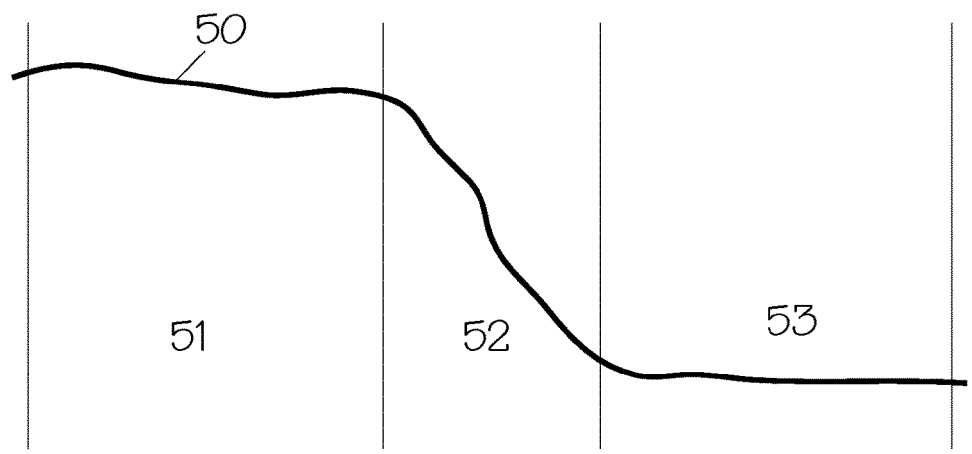
FIG. 4 shows a schematic of litter heights for different zones.

Turning now to FIG. 4, we see a schematic representation of litter height 50 in the three zones: outside zone 50, channel zone 52, and equipment zone 53.

Figure 5:
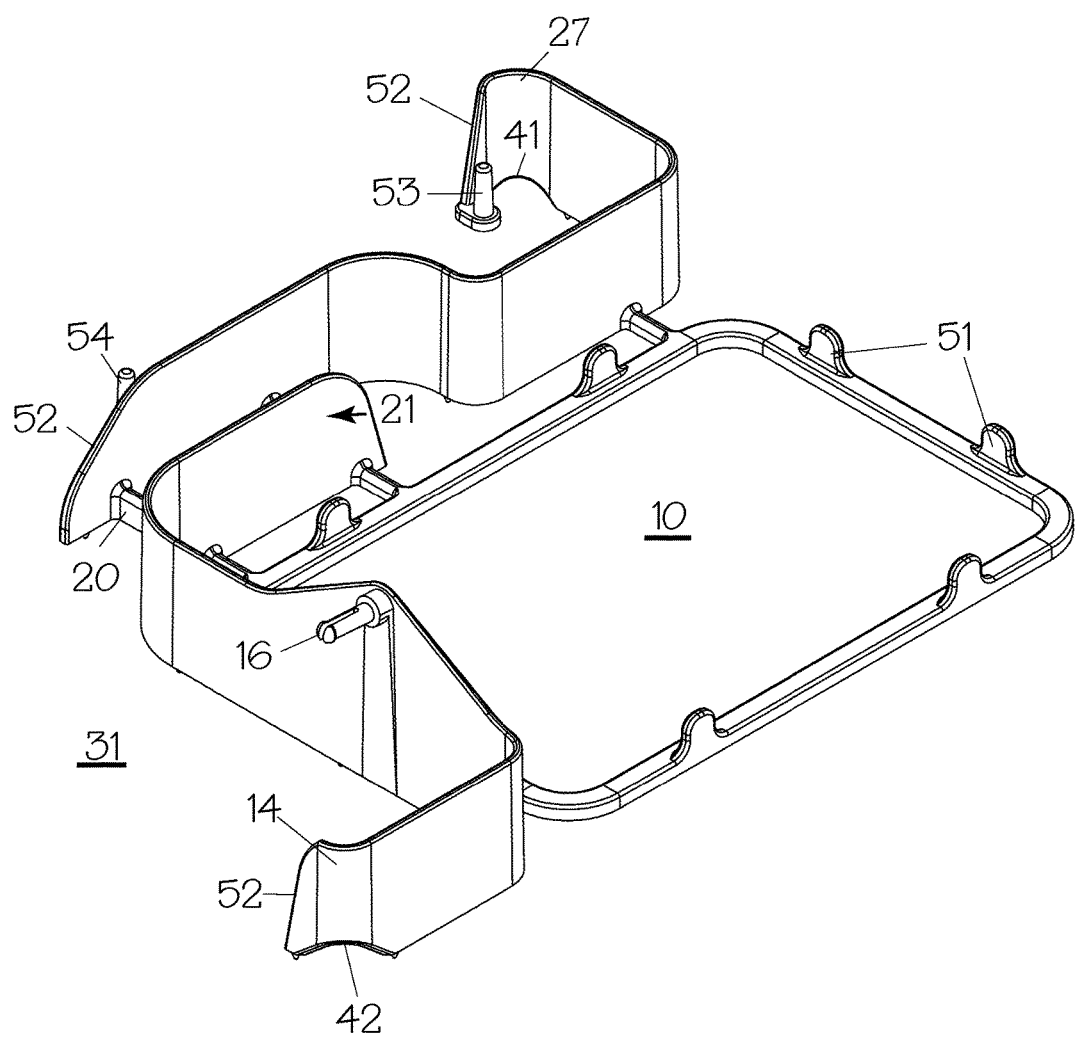
FIG. 5 shows another embodiment in perspective view of the device.

Turning now to FIG. 5, we see another embodiment in perspective. Reference designators previously used identify the same or functionally equivalent element. This embodiment provides support and a fixed cage position of additional in-cage equipment such as a ladder, wheel, climbing structure, exercise device, keep-out device and the like, using pins 53 and 54. A scale or other equipment is positioned in a cage via tabs, 51. Here eight tabs are used, two of which are identified by 51. Curved corners are used to avoid injury to an animal, minimize chewing, increase light and visibility and reduce material cost, 52, shown in three places.

Figure 6:
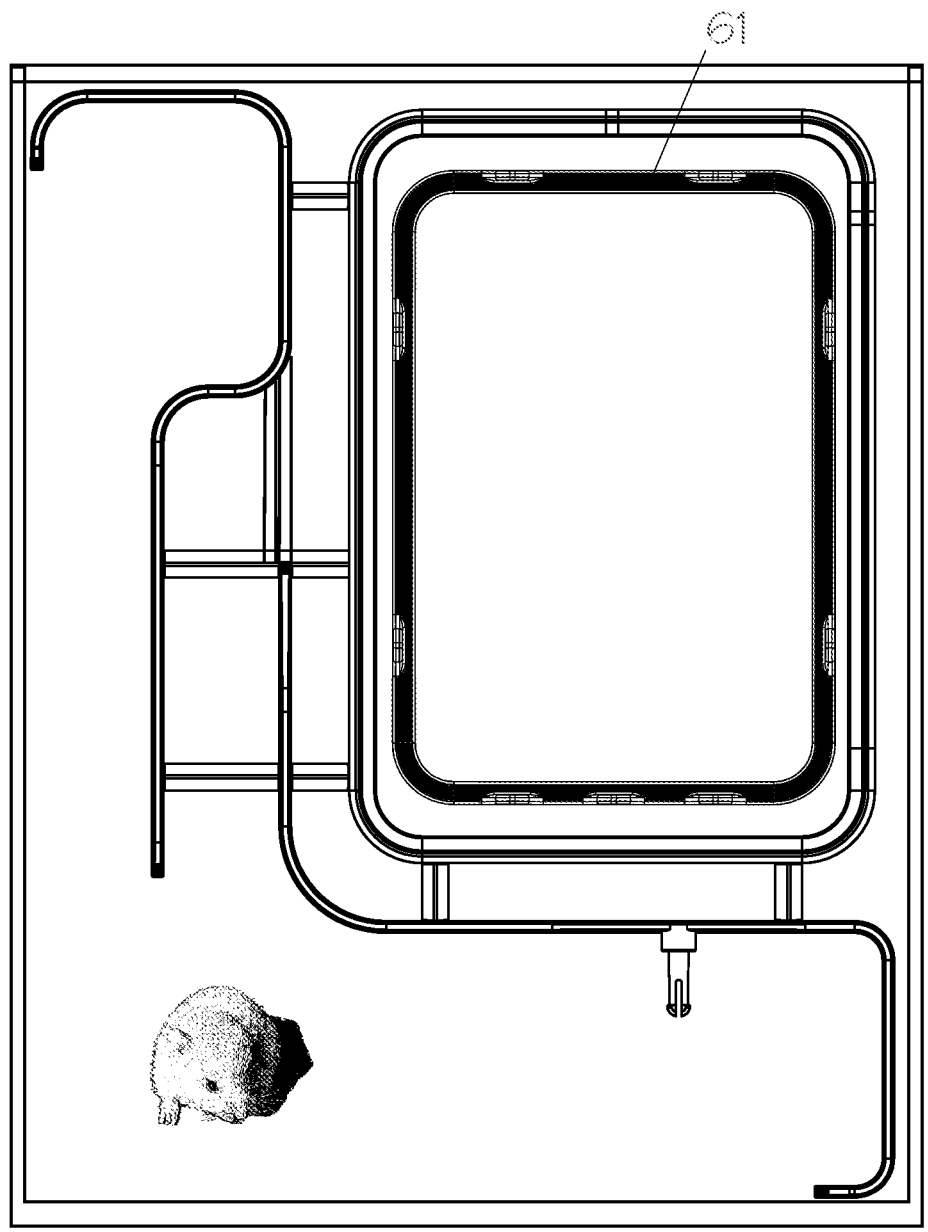
FIG. 6 show a scale in the device.

FIG. 6 shows one embodiment of a scale 61 in the device, in equipment zone 10.

Figure 7:
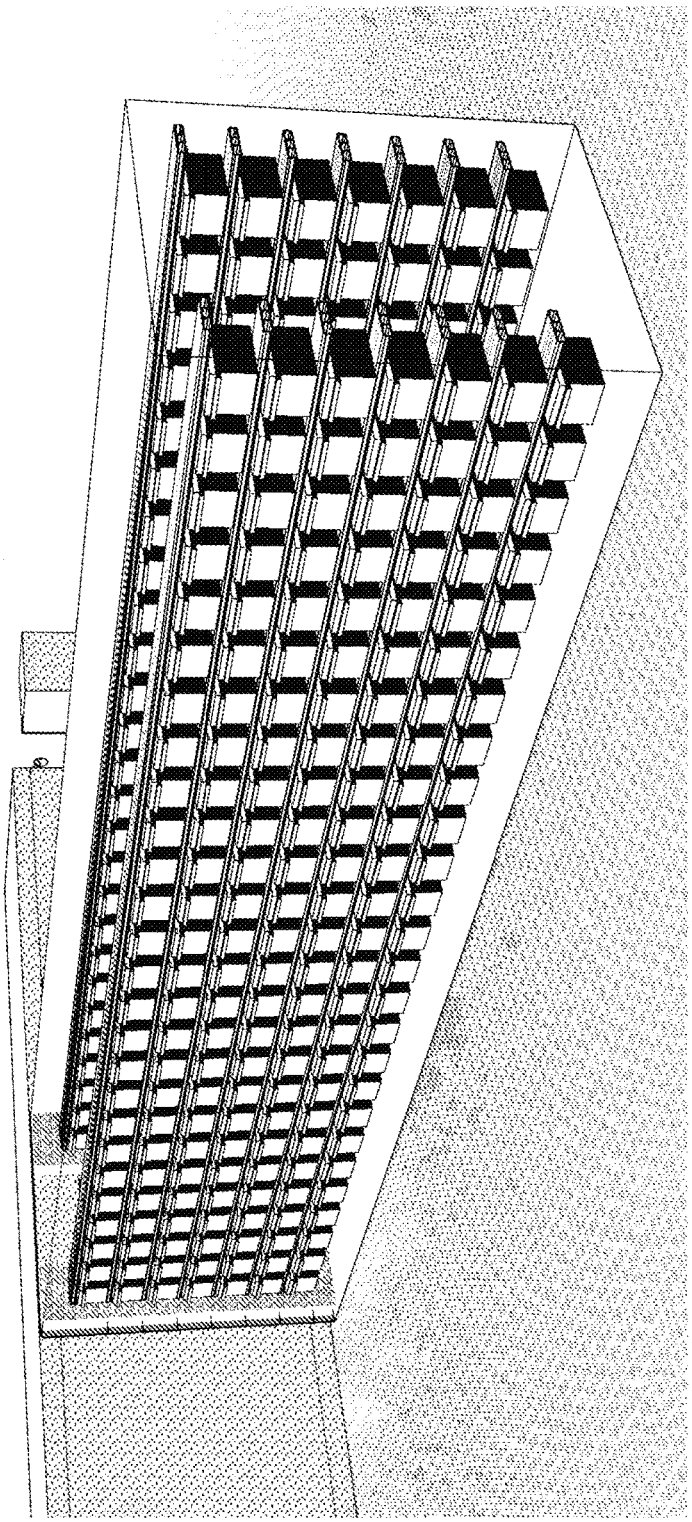
FIG. 7 shows a vivarium with cages.

FIG. 7 shows a vivarium with cages, where such cages may hold embodiments of this invention.

The device may be constructed using 3D printing, injection molded, or other fabrication methods. Monolithic construction is optional but desirable for cleaning and sterilization. Material used should be non-toxic to animals in the cage, or resist chewing, or both. The material should be cleanable and sterilizable. PET, PETG and ABS plastics are suitable materials. Metal may be used. The device should have no sharp corners or edges to prevent injury to animals. In some applications, some chewing by animals is acceptable. The devices may be discarded after one or a few uses. Many types of bedding are compatible with the device, although some dimensions may change for optimal performance, such as the height of the walls or baffles. Litter types corncob and ALPHA-dri (LBS Biotech, PO Box 432 HRH6 0UW, United Kingdom) are acceptable litters.

It is understood in the art that cage litter, as well as urine, food, feces, and other detritus finds its way into every location, crack and corner of a cage. The purpose of the invention is to minimize litter in an equipment zone to maximize optimal, proper or acceptable operation of the equipment. Therefore, absolutes such as, "blocking litter" need to be construed to mean, "sufficient for the embodiment to perform its intended operation." One such metric of performance is restricting litter such that equipment in the cage, such as a scale, operates properly, for a period of time until the cage is cleaned or the equipment is no longer in use. Another such metric is keeping litter from accumulating between a piece of equipment and the sides of the cage. Embodiments are claimed where a novel benefit is the combination of (i) elevating a piece of equipment, such as a scale, above the floor bottom, and (ii) maintaining a piece of equipment, such as a scale, away from the sides of the cage, such as in the range of 2 to 20 mm or 4 to 12 mm or 4 to 8 mm, and (iii) use of baffles in the described physical configurations and embodiments.

All embodiment and combinations may be used in a vivarium.

Embodiments are specifically claimed for a vivarium that uses the device in a cage. Embodiments are specifically claimed for a vivarium that uses the device with a scale in the equipment zone. Embodiments are specifically claimed for use with a weighing scale in the equipment zone. The scale may be wireless, sterilizable, or both. Embodiments are specifically claimed with electronic sensors in the equipment zone, in the channel zone, or both. Such sensors may detect animal weight; detect animal temperature; read an animal RFID, bar code or other animal identification; or detect the presence of an animal. Elevation by an embodiment of equipment in the equipment zone is specifically claimed. Corner cuts in embodiments to fit or mate with an interior of a cage are specifically claimed. Embodiments or portions of embodiments may be clear, translucent or white to aid in light distribution. Embodiments or portions of embodiments may have holes or openings to support airflow in a cage. Embodiments are specifically claimed for a method of operating vivarium using the device in cages.

Definitions

Access—the use in claims, refers both to access by animals in the cage and substantially to access of litter in the cage. Here, substantially means for the purpose of the invention, such as limiting the amount of litter that moves, over the expected time period of the device, such that equipment in the equipment zone is not compromised by the presence of litter.

Against—the used in claims, for an object or element against another object or element means that it may touch, join, mate or penetrate. Against may not be absolutely touching, but may also comprise proximal.

Animal—most commonly: rodents, such as mice. However, no limitations less than the scientific definition of animal are implied.

Baffle height—maximum height is determined by not being an impediment for animals to cross, including animals that may be sick or infant. In general, the higher the baffle the more litter it blocks.

Cage—an enclosure for an animal.

Communications element—one or more electronic components that send, receive or both, digital or analog data. Methods used include but are not limited to IR light, UV light, visible light, audio, sub-audio, ultrasonic, wireless, near-field or far-field radio, haptic, or other electromagnet communications.

Electrically connected—when two or more elements are electrically or electronically connected to each other, or adapted to be so connected, there may be or may not be intervening electrical or electronic elements, including but not limited to processors, filters, communication links and the like. So long as the two elements and the embodiment operate as if they are electrically or electronically connected, and they are effectively so connected, the connecting is equivalent. Note the intervening elements may change the form, timing, filtering or aggregation of the signals or data; however, so long as data exiting the connection is responsive to the data entering the connection the connection is equivalent for the purposes of an embodiment or claim.

Equipment restraint—maintains equipment in a predetermined location, either relative to the device or relative to a cage, or both.

Fixed—when two or more elements are fixed or affixed to each other, there may be or may not be intervening elements, such as spacers, rods, arms, washers and the like. So long as the two elements and the embodiment operate as if they are fixed, and they are effectively so mechanically coupled, the fixing is equivalent.

Free of rigid attachment—means the upper module is able to move or transmit weight as motion or as pressure to the lower module. It may sit on or pass through a flexible membrane, or another flexible support, such as rubber pads, hinges, scissors support, or other compliant coupling.

Litter—also known as animal bedding. Litter does not refer to animal offspring unless specifically so stated. Litter also comprises nesting material, either solid material or loose material that is placed in the cages. One function of litter is to absorb, collect or pass urine and feces.

Mechanically coupled or operatively mechanically coupled—transfer weight, motion or pressure from one element to another via the mechanical coupling or operative mechanical coupling. This describes a specific structural element or operation of a specific structural element, not a "functional element" in a claim. As one example, transfer points refers to a structural element, not a functional element. Such structural v. functional applies to claim construction. "Operative" means such that the scale functions as intended. One embodiment mechanically couples from a weighing surface to the free ends of one or more load cells to effectively transfer the weight on the weighing surface to the freed ends of the one or more load cells.

Mechanical element—means a physical portion of a device. No mechanical action, such as movement, is implied by the term.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Rodent—most commonly: mice, rats and guinea pigs. However, no limitations less than the scientific definition of rodent are implied.

Sealed enclosure—an enclosure sealed against pathogens that impact or alter study results, or alter the credibility or repeatability of study results, entering or leaving the enclosure.

Singulation—one animal at a time

Sterile—pathogen-free. Note that "sterile" may refer to one volumetric area compared to another and may refer only to problematic pathogens, depending on a study, study animals, and safety considerations.

Wall height—the minimum height is the height that the animals will not toss litter over. Animals may choose to climb on or over the wall. The maximum height is such that the device fits in an animal cage. However, a height less than this may be desirable for visibility, airflow, cost, access, and the like.

Zone—an area of cage floor or volume within a cage. A zone may comprise any combination of animals, litter, and equipment. Boundaries between zones may be exact or approximate.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

The invention claimed is:
1. A device for a purpose of restricting movement of animal litter in an animal cage comprising:
   walls, wherein the walls define three volumetric zones, each zone proximal to a floor in an animal cage:
      an equipment zone,
      an outside zone, and
      a channel zone;
   two or more baffles in the channel zone, wherein a height of the baffles is lower than a height of the walls;
   one or more mechanical elements adapted to fit against an interior of animal age such that the device is constrained to a predetermined location in the cage;
   wherein the channel zone connects the outside zone to the equipment zone free of walls;
   wherein the three zones are open on top;

wherein the combination of sides of the animal cage and walls create a barrier around the equipment zone such that the only access, free of walls, between the equipment zone and the outside zone is via the channel zone.

2. The device of claim 1 further comprising:
an equipment restraint in the equipment zone.

3. The device of claim 2 wherein:
the equipment restraint is adapted to hold a weighting scale.

4. The device of claim 2 further comprising:
a second equipment restraint in the outside zone configured to restrain in a predetermined cage location a piece of animal exercise equipment.

5. The device of claim 1 further comprising:
a weighting scale in the equipment zone.

6. The device of claim 1 further comprising:
at least one corner cut in a bottom portion of the device wherein the corner cut is adapted to fit against a curved interior corner of the animal cage.

7. The device of claim 1 further comprising:
an RFID reader in the channel zone.

8. The device of claim 1 wherein:
the channel zone is adapted to singulate animals passing through the zone.

9. The device of claim 1 further comprising:
a camera oriented to observe animals in the channel zone; and
animal identification software adapted to identify animals, responsive to an output from the camera, in the channel zone.

10. The device of claim 1 wherein:
the walls comprise a wall height adapted to permit an animal in the animal cage to climb over the top of the wall.

11. The device of claim 1 wherein:
all three zones are open on their bottom, when the device is free-standing outside the cage.

12. The device of claim 1 wherein:
the device is open on its top such that a camera suitably positioned at a top of the animal cage has a view of an animal in all three zones.

13. The device of claim 1 wherein:
the device is monolithic, and
wherein the device is adapted to manually lift in an out of the animal cage without the use of tools.

14. The device of claim 13 wherein:
the device is adapted such than all equipment restraints are adapted to removably accept suitable equipment without the use of tools.

15. The device of claim 1 wherein:
the device is sterilizable to a level of sterility appropriate for use in vivarium animal cages.

16. The device of claim 1 further comprising a vivarium, wherein a plurality of cages in the vivarium surround the device as limited by the elements in claim 1.

17. The device of claim 1 wherein,
the device is in an animal cage in a vivarium.

18. A method of using the device of claim 1 in an animal cage comprising the steps:
placing the device in an animal cage;
placing litter in the animal cage, in the outside zone;
placing an animal in the animal cage.

19. The method of claim 18 comprising the additional step:
placing a scale in the animal cage, in the equipment zone;
weighing the animal.

* * * * *